Patented Mar. 30, 1954

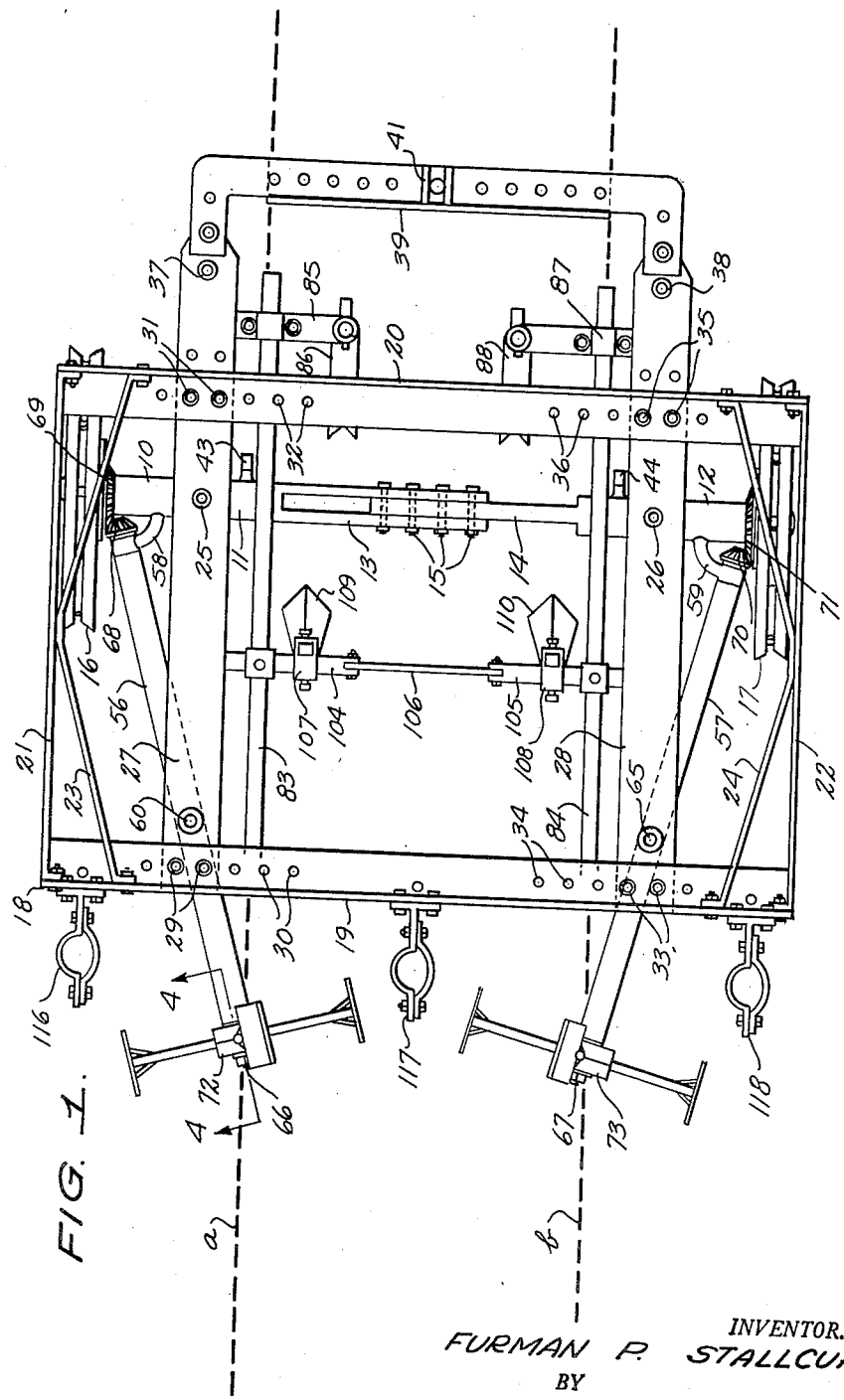

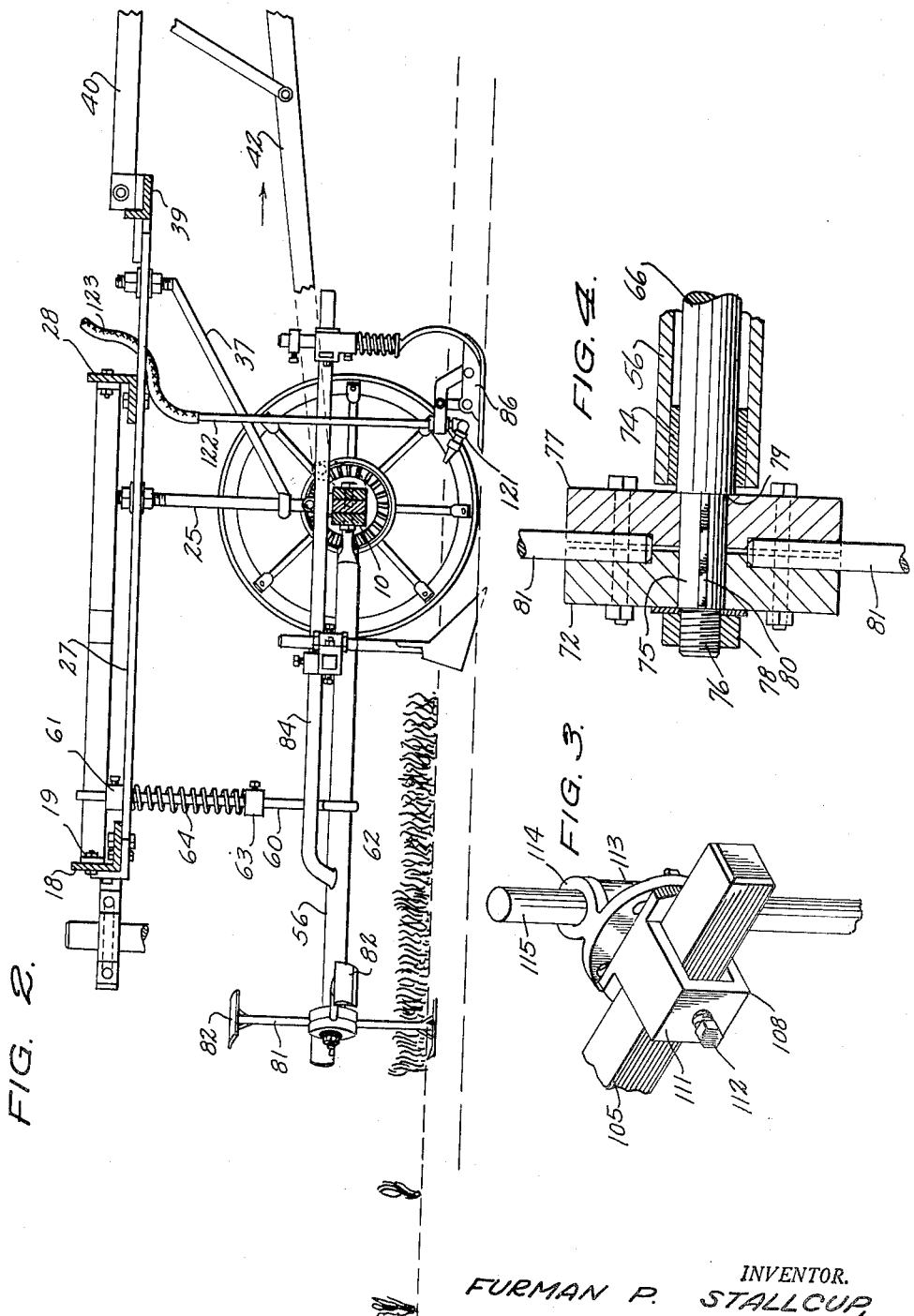

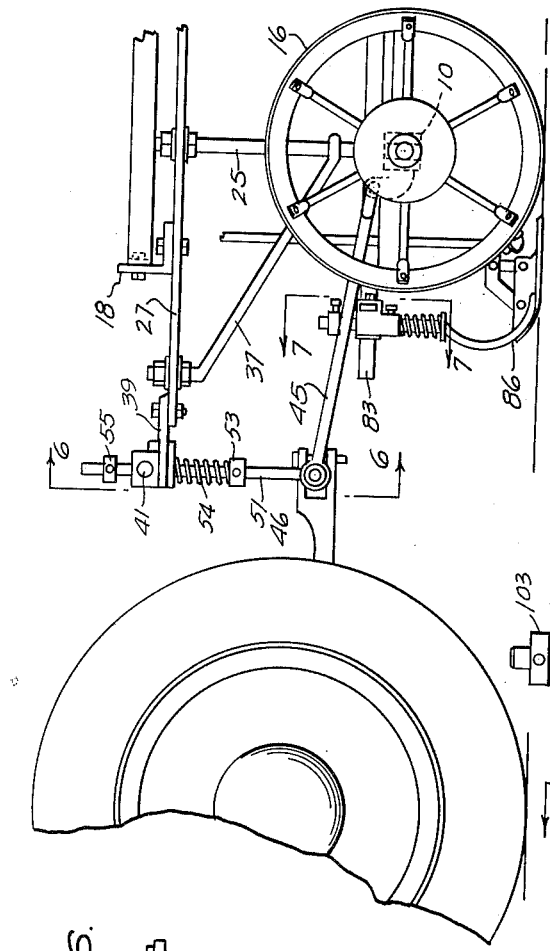
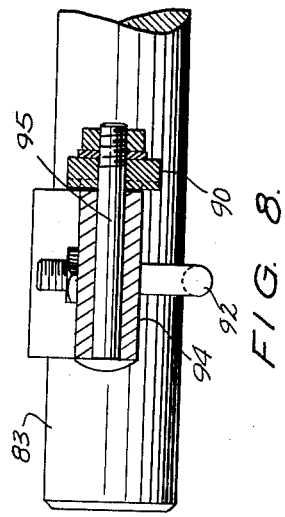
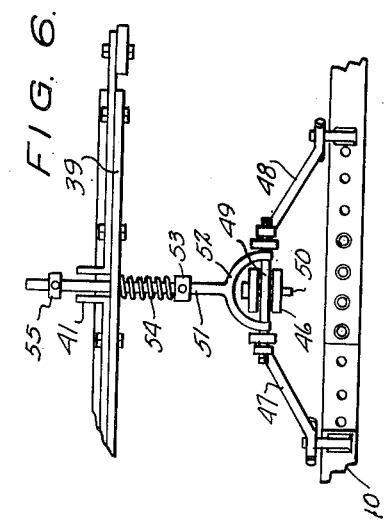
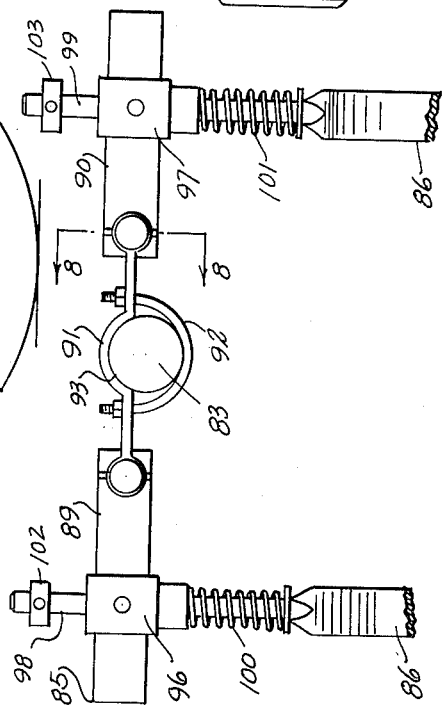

2,673,503

UNITED STATES PATENT OFFICE 2,673,503

COTTON CHOPPING AND CULTIVATING MACHINE

Furman P. Stallcup, Jonesboro, Ark., assignor of one-half to Mode Gregory, Jonesboro, Ark.

Application August 25, 1950, Serial No. 181,450

2 Claims. (Cl. 97—15)

This invention relates to agricultural machinery especially designed for cultivating and chopping or thinning cotton, and more particularly to a machine which may be used either by itself or in combination with known cultivators to cultivate and thin row crop plants, such as cotton, in one operation.

It is among the objects of the invention to provide an improved cultivating and chopping machine which is supported on its own wheels so that its depth of operation can be accurately regulated and derives its power from its own wheels to provide a uniform thinning operation, which is fully adjustable to compensate for variation in the spacing of crop rows and to regulate the operating depth of the machine, which may be used for chopping or thinning alone, or for simultaneous thinning and cultivating or blocking, or for simultaneous thinning, cultivating and spraying, which can be operatively coupled to various types of tractors and may have different types of cultivators coupled to it, and which is simple and durable in construction, positive and efficient in operation, and easy to adjust and operate.

Other objects and advantages will become apparent from a consideration of the following description and the appended claims in conjunction with the accompanying drawings, wherein:

Figure 1 is a top plan view of an agricultural machine or implement illustrative of the invention;

Figure 2 is a cross-sectional view on the line 2—2 of Figure 1;

Figure 3 is a perspective view of a fragmentary portion of the machine as illustrated in Figure 1 showing a structural detail;

Figure 4 is a fragmentary cross-sectional view on an enlarged scale on the line 4—4 of Figure 1;

Figure 5 is a side elevational view of a fragmentary front portion of the machine and a fragmentary rear portion of a towing tractor;

Figure 6 is a fragmentary cross-sectional view on the line 6—6 of Figure 5;

Figure 7 is a fragmentary cross-sectional view on the line 7—7 of Figure 5; and

Figure 8 is a fragmentary cross-sectional view on the line 8—8 of Figure 7.

With continued reference to the drawings, the machine comprises an axle 10 made in two parts 11 and 12 of which the part 11 has a bifurcated end portion 13 and the part 12 has on its corresponding end a tongue formation 14 received in the bifurcated portion or formation 13 and secured therein by bolts 15 which extend through registering apertures in the bifurcated portion 13 and tongue formation 14. Either the bifurcated formation or the tongue formation or both of these formations are provided with additional apertures in which the bolts 15 are selectively receivable for varying the length of the axle to accommodate the machine to variations in the spacing between crop rows.

A wheel 16 is journaled on the outer end of the axle portion 11 and a corresponding wheel 17 is journaled on the outer end of the axle portion 12. These wheels 16 and 17 support the machine on the ground and provide power for the operation of the chopping or thinning mechanism, each of such wheels having a tire portion of U-shaped cross-section and cleats extending transversely between the two sides of the tire portion at angular intervals therearound. Wheels of this character provide better trailing characteristics for the machine and better traction for driving the mechanical equipment.

A rigid, rectangular frame 18 is disposed above the axle 10, and comprises a rear cross member 19, preferably formed of a heavy piece of angle iron, a front cross member 20, also formed of angle iron, and side members 21 and 22, which may be formed of lighter material and reinforced by braces 23 and 24, respectively connected at their ends to the front and rear cross members and intermediate their lengths to the side members 21 and 22.

The frame is supported on the axle by two standards 25 and 26 which extend upwardly from the axle parts 11 and 12, respectively, at locations spaced from the corresponding wheels 16 and 17. Two flat bars 27 and 28 extend longitudinally of the frame with the bar 27 disposed adjacent to and substantially parallel to the side member 21 and the bar 28 disposed adjacent and substantially parallel to the side member 22. The front and rear end members are provided with series of spaced apart apertures, and the bar 27 is adjustably secured at its rear end to the rear end member by bolts 29 which extend through apertures in the bar and selected apertures 30 in the rear frame member 19. This bar is connected to the front end member 20 by bolts 31 extending through apertures in the bar and selected apertures 32 of a series of apertures in the front frame member. Bar 28 is adjustably secured to the rear frame member 19 by bolts 33 which extend through apertures in the rear end of the bar and through selected apertures 34 of a corresponding series of apertures in the rear frame member and is adjustably secured to the front frame member 20 by bolts 35 extending through apertures in the bar 28 and selected apertures 36 of a corresponding series in the front frame member.

The standard 25 is secured at its upper end to bar 27 near the side of the front frame member 20 facing the rear member 19 and standard 26 is secured at its upper end to bar 28 near the rear side of front frame member 20.

Bars 27 and 28 extend forwardly of front frame member 20 and diagonal braces 37 and 38 extend respectively from standards 25 and 26 near axle 10 to bars 27 and 28 near the front ends of these bars to rigidly support the frame 18 on the axle.

A tow bar 39 is disposed ahead of, and substantially parallel to, the front frame member 20 and is secured at its respectively opposite ends to the front ends of the bars 27 and 28. Where a tractor is used having a compression link disposed above its traction links, the compression link, as indicated at 40 in Figure 2, is secured at its rear end to the tow bar 39 by a clevis formation 41 provided on the tow bar substantially at the mid-length location thereof, and the tension links 42 are extended rearwardly and secured to the axle parts 11 and 12 by the lugs 43 and 44.

Where the tractor is not provided with tension and compression links, a V-shaped yoke 45 is connected at its open end to the lugs 43 and 44 and at its closed end to the tractor drawbar 46, as illustrated in Figure 5.

As illustrated in Fig. 6, the legs 47 and 48 of the yoke are pivotally connected at their forward ends to the respectively opposite ends of a hitch plate 49 which is received in the drawbar clevis and secured therein by the hitch pin 50 and a standard 51, having on its lower end a fork 52 pivotally connected to the plate 49 near the respectively opposite ends of the plate, extends upwardly from the plate and through the tow bar 39 and between the sides of the clevis formation 41. A stop collar 53 is secured on the standard 51 adjacent the fork 52 and a compression spring 54 surrounds the standard between this stop collar and the under side of the tow bar 39. A second stop collar 55 is secured on the standard above the tow bar so that the tow bar will not accidentally slip off of the upper end of the standard.

In the arrangement illustrated in Figures 5 and 6, the standard 51, together with the standards 25 and 26, support the frame 18 in substantially horizontal position above the axle 10.

In the arrangement illustrated in Figure 2, the tension and compression links of the tractor perform this function of supporting the frame in substantially horizontal position above the axle.

Two elongated bearing sleeves 56 and 57 are disposed below the frame at respectively opposite sides of the frame and both extend rearwardly from the axle 10 in spaced apart relationship to each other.

The sleeve 56 is secured by a bracket 58 to the axle part 11 adjacent the wheel 16 and the sleeve 57 is secured at its front end to the axle part 12 by a bracket 59 disposed adjacent the wheel 17.

A hanger 60 extends through an aperture in the bar 27 near the rear frame member 19 and carries a stop collar 61 above the bar 27 so that the hanger depends from the bar. At its lower end the hanger is provided with an eye 62 which receives the sleeve 56 intermediate the length of the sleeve. A stop collar 63 is secured on the hanger or hanger rod 60 below the bar 27 and a compression spring 64 surrounds the hanger between the collar 63 and the bar 27.

A similar hanger 65 depends from the bar 28 near the frame rear member 19 and is provided at its lower end with an eye which receives the sleeve 57 intermediate the length of this sleeve. By this means the sleeves 56 and 57 are adjustably supported from the frame since the collars on the hangers can be adjusted to raise and lower the rear ends of these sleeves and the bars 27 and 28 can be moved relative to the frame end members to vary the distance between the rear ends of the sleeves and also change the angular relationship between the sleeves and the longitudinal center line of the machine.

As illustrated in Figure 1, the two sleeves are rearwardly convergent from the axle 10 and extend rearwardly of the rear frame member 19, the rear ends of these sleeves being disposed directly above two adjacent crop rows, as indicated at $a$ and $b$.

A shaft 66 extends through and is journaled in the sleeve 56, and a corresponding shaft 67 extends through and is journaled in the sleeve 57. A bevel gear 68 is secured on the shaft 66 at the front end of the sleeve 56 and meshes with a bevel gear 69 provided on the inner side of the hub of the wheel 16. A bevel gear 70 is secured on the shaft 67 at the front end of the sleeve 57 and meshes with a bevel gear 71 provided on the inner side of the hub of the wheel 17.

With this arrangement, when the machine is propelled so that the ground-engaging wheels 16 and 17 are rotated, both of the shafts 66 and 67 will be rotated in the corresponding sleeves 56 and 57.

A hoe assembly 72 is secured on the shaft 66 at the rear end of the sleeve 56 and a corresponding hoe assembly 73 is secured on the shaft 67 at the rear end of the sleeve 57. As the two hoe assemblies are substantially identical, a detailed illustration and description of one only is considered sufficient for the purposes of the present disclosure and the assembly 72 has been selected for such detailed illustration and description.

Referring to Figure 4, the sleeve 56 is provided with a bearing bushing 74 in its rearward end and the shaft 66 is journaled at its rearward end in this bushing. Rearwardly of the sleeve 56, the shaft 66 is provided with a reduced portion 75 having a screw-threaded end 76. A two-part hub 77 is provided with a central aperture receiving the reduced portion 75 of the shaft 66, and this hub is secured on the shaft by a nut 78 which is threaded on the screw-threaded portion 76 of the shaft and clamps the hub between itself and the annular shoulder 79 at the other end of the reduced portion 75. The shaft is drivingly connected to the hub by suitable means, such as the key 80, and spokes 81 are secured each at one end to hub 77 and project radially therefrom.

In the arrangement illustrated there are four spokes spaced at angular intervals of 90° from each other, and a hoe or blade 82 is secured on the outer end of each spoke. Each blade 82 may conveniently comprise a rectangular plate transversely curved and having at least one sharpened edge, the length of such plate being correlated to the desired spacing between the plants to be left in the crop row.

The spacing between the plants left in the crop rows is controlled not only by the width of the blades, but also by the number of blades in each hoe assembly and by the speed ratio between the gears 69 and 71 and the gears 68 and 70, respectively, predetermining the speed of the shafts 56 and 57 relative to the rotational speed of the wheels.

The spokes 81 are of a length such that, when the machine is operatively connected to a tractor and properly positioned for operation, the hoes 82 will dig into the ground a predetermined amount to chop out the roots, as well as the above-ground portions of the undesired plants. An elongated rod 83 is secured at its rear end to the sleeve 56 rearwardly of the hanger 60 and extends forwardly past the axle 10 generally parallel to the longitudinal center line of the machine. A similar rod 84 is connected at its rear end to the sleeve 57 rearwardly of the hanger 65 and also extends forwardly past the axle 10 and generally parallel to the longitudinal center line of the machine. It is to be understood that the parallel relationship of the rods 83 and 84 to the center line of the machine is only general, since these rods will be disposed at slight angles to the center line of the machine when the sleeves 56 and 57 are laterally adjusted to condition the machine to different row spacing.

A crossbar 85 is secured to the rod 83 near the front end of the rod and extends laterally to opposite sides of the rod, and a pair of spaced apart shoes or runners 86 are carried by this crossbar at the respectively opposite ends thereof and run on the ground to support the front end of the rod. A similar crossbar 87 is secured to the rod 84 near the front end of the latter and extends to opposite sides of the rod and a pair of shoes 88 are carried by the crossbar 87 at respectively opposite ends thereof and bear on the ground to support the front end of the rod 84.

As the two crossbar and shoe or runner assemblies are substantially identical, a detailed illustration and description of one only is considered sufficient for the purposes of the present disclosure and the assembly mounted on the rod 83 has been selected for such detailed illustration and description.

Referring to Figures 7 and 8, the crossbar 85 comprises two parts 89 and 90 disposed at respectively opposite sides of the rod 83 and spaced therefrom, and a clip 91 secured on the rod and connected at its respectively opposite ends to the parts 89 and 90. The clip 91 comprises a saddle part overlying the rod and a U-bolt 92 underlying the rod and extending at its ends through suitable apertures in the saddle portion with nuts threaded onto the ends of the U-bolt and bearing on the saddle portion 93.

The saddle portion 93 is provided at each end with a sleeve or eye, as indicated at 94 in Figure 8, and a bolt 95 extends through each sleeve and through an aperture in the corresponding part 89 or 90 to secure the parts to the saddle portion.

A bracket 96 is adjustably mounted on the part 89 and a similar bracket 97 is adjustably mounted on the part 90. A substantially vertically disposed stem 98 extends through the bracket 96, and a similar stem 99 extends through the bracket 97. The shoes or runners 86 are provided on the lower ends of the stems 98 and 99, and a compression spring 100 surrounds the stem 98 between the corresponding shoe and the bracket 96, while a similar compression spring 101 surrounds the stem 99 between its corresponding shoe and the bracket 97. Stop collars 102 and 103 are adjustably secured on the stems 98 and 99, respectively, above the brackets 96 and 97 so that the stems cannot pass downwardly through the brackets. The front ends of the rods 83 and 84 are thus resiliently supported by the springs 100 and 101 on the ground-engaging shoes 86 and 88, and these rods assist in supporting the hoe assemblies 72 and 73 at a predetermined position relative to the surface of the ground.

A second crossbar 104 is mounted on the rod 83 rearwardly of the axle 10, and a similar crossbar 105 is mounted on the rod 84 rearwardly of the axle. These crossbars extend to respectively opposite sides of the corresponding rods 83 and 84 and are connected together at their adjacent ends by a link 106. Two brackets 107 are secured on the crossbar 104 and disposed one at each side of the rod 83, while two similar brackets 108 are secured on the crossbar 105 and disposed one at each side of the rod 84. Cultivator shovels 109 are carried one by each of the brackets 107, and similar cultivator shovels 110 are carried, one by each of the brackets 108.

Referring to Figure 3, it will be seen that each of the crossbars is of rectangular cross-sectional shape and that each of the cultivator shovel-supporting brackets comprises a hollow rectangular member 111 slidably mounted on the corresponding crossbar and secured in operative position thereon by a set screw 112 and a part or portion 113 adjustably secured to the part 111 and provided with a socket 114 through which the stem 115 of the corresponding cultivator shovel extends. The part 113 is angularly adjustable relative to the part 111, so that the angular relationship of the stem 115 to the vertical can be varied, and the spacing between the shovels can be adjusted both by moving the brackets along the corresponding crossbars and by angularly converging or diverging the shovel stems.

Three split clamps 116, 117 and 118 are secured to the rear frame member 19 and project rearwardly therefrom. The clamps 116 and 118 are located near the respectively opposite ends of the frame member 19, and the clamp 117 is located substantially at the mid-length location of the frame member. These clamps are arranged to engage cultivator frames so that the cultivators can be towed behind the chopping and cultivating machines, if desired.

If desired, the beveled gears 69 and 71 can be removed and chain sprockets substituted therefor to operate a fertilizer or seeder attachment mounted on the frame 18.

As illustrated in Figure 2, nozzles 121 may be mounted, one at each of the shoes 86 and 88, and connected to a tank supported either on the machine or on the towing tractor by suitable tubes 122 and hose connections 123 so that the crop can be sprayed with a suitable insecticide or other composition during the thinning and cultivating operation.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. An agricultural implement comprising an axle, wheels journaled on said axle one at each end thereof, a frame supported on said axle and disposed above the latter, bearing sleeves extending in the same direction from said axle in spaced apart relationship to each other, means connecting one end of one sleeve to said axle adjacent one of said wheels, means connecting one end of the other sleeve to said axle adjacent the other of said wheels, spring biasing means connecting each of said sleeves intermediate the length thereof to said frame for biasing said sleeves downward from said frame, shafts journaled one in each of said sleeves, a gear drive between each shaft and the adjacent wheel, hoe assemblies mounted one on each shaft at the ends of the corresponding sleeves remote from said axle, hitch means secured to said axle and extending therefrom in a direction opposite that in which said sleeves extend, rods disposed one along each of said sleeves and each connected at one end to the corresponding sleeve intermediate the length of the latter and extending past said axle, and ground engaging shoe means secured to each rod at a location spaced from said axle and assisting said axle and said spring biasing means in supporting said hoe assemblies at a predetermined position relative to the surface of the ground, said ground engaging shoe means including a resilient biasing connection with said rod for vertical movement toward and away from the associated rods.

2. A row crop thinning and cultivating machine comprising an axle, wheels journaled on said axle one at each end thereof, a frame disposed above said axle, means supporting said frame on said axle, bearing sleeves supported from said frame at the level of said axle and extending in substantially the same direction from said axle in spaced apart relationship to each other, spring biasing means connecting each of said sleeves intermediate the length thereof to said frame for biasing said sleeve downward from said frame, shafts journaled one in each of said sleeves, a gear on the axle-adjacent end of each shaft, a gear on each wheel meshing with the adjacent shaft-carried gear, a hoe assembly on the axle-remote end of each shaft, rods rigidly secured each at one end one to each of said sleeves intermediate the length thereof and extending along the corresponding sleeve past said axle, and ground engaging shoe means secured to each rod at a location spaced from said axle and assisting said axle and said spring biasing means in supporting said hoe assembly at a predetermined position relative to the surface of the ground, said ground engaging shoe means including a resilient biasing connection with said rod for vertical movement toward and away from the associated rods.

FURMAN P. STALLCUP.

References Cited in the file of this patent

UNITED STATES PATENTS

| Number | Name | Date |
|---|---|---|
| 148,157 | Watrous | Mar. 3, 1874 |
| 252,221 | Hughes | Jan. 10, 1882 |
| 1,079,671 | Simmons et al. | Nov. 25, 1913 |
| 1,243,046 | Cunningham | Oct. 16, 1917 |
| 1,305,840 | Thornhill | June 3, 1919 |
| 1,701,137 | Buchwald | Feb. 5, 1929 |
| 1,718,818 | Hanson | June 25, 1929 |
| 1,776,330 | Chenault | Sept. 30, 1930 |
| 1,779,834 | Uddenborg | Oct. 28, 1930 |